United States Patent [19]
Coats et al.

[11] Patent Number: 5,233,868
[45] Date of Patent: Aug. 10, 1993

[54] NON-INTRUSIVE MASS FLOW MEASURING APPARATUS AND METHOD

[76] Inventors: Montgomery R. Coats, 1207 Bob White Ct., Round Rock, Tex. 78681; Jack C. Cook, 808 Rockmoor Dr., #503, Georgetown, Tex. 78628; Glen Beatty, 1211 Robin Trail, Round Rock, Tex. 78681

[21] Appl. No.: 867,972
[22] Filed: Apr. 13, 1992
[51] Int. Cl.$^5$ .............................................. G01F 1/68
[52] U.S. Cl. ................................................ 73/204.18
[58] Field of Search .......... 73/204.16, 204.18, 204.19, 73/204.25, 204.27

[56] References Cited
U.S. PATENT DOCUMENTS

| | | | |
|---|---|---|---|
| 2,586,060 | 2/1952 | Kronberger | 73/202 |
| 2,603,089 | 7/1952 | Morley et al. | 73/204 |
| 2,972,885 | 2/1961 | Laub | 73/204 |
| 3,019,647 | 2/1962 | Beard et al. | 73/204 |
| 4,255,968 | 3/1981 | Harpster | 73/204.18 |
| 4,373,386 | 2/1983 | Schuddemat et al. | 73/189 |
| 4,487,062 | 12/1984 | Olin et al. | 73/202 |
| 5,048,332 | 9/1991 | Ishikawa et al. | 73/204.16 |

FOREIGN PATENT DOCUMENTS 0402822 1/1992 Japan ............................ 73/204.11

Primary Examiner—Herbert Goldstein
Attorney, Agent, or Firm—Shaffer & Culbertson

[57] ABSTRACT

A non-intrusive mass flow measuring apparatus includes a sensor unit and a processor unit. The sensor unit includes a sensor conduit, a heating element, and three separate temperature sensor elements. The three temperature sensor elements are spaced out along the length of the sensor conduit from the heating element. The middle, compensating temperature sensor element, enables the coefficient of conductive heat transfer along the conduit to be decoupled from the coefficient of convective heat transfer from the fluid, from which mass flow may be derived. A processor uses the temperatures sensed by the three sensors to determine a normalized temperature parameter related to the coefficient of convective heat transfer, and then utilizes temperature data and the normalized temperature parameter in a preferably empirically determined relationship to determine a mass flow value.

15 Claims, 3 Drawing Sheets

NON-INTRUSIVE MASS FLOW MEASURING APPARATUS AND METHOD

BACKGROUND OF THE INVENTION

This invention relates to flow measuring or sensing devices, and particularly to a non-intrusive thermal flow probe and flow measuring method.

A thermal flow probe determines the mass flow rate of a fluid flowing through a conduit by measuring heat transfer to the fluid. Prior thermal flow probes included a conduit and two resistive temperature sensors positioned within the conduit, a freestream sensor and a heated sensor positioned downstream of the freestream sensor. Both sensor elements intruded into the flow area of the conduit to maximize the heat transfer relationship with the fluid flowing therethrough. A heating device was connected to the heated sensor to elevate the temperature of the heated sensor element. With this arrangement, the heater input power required to maintain a constant temperature difference between the two sensors was proportional to the mass flow rate of a fluid flowing through the conduit and could be measured to provide a mass flow measurement.

Although intrusive thermal flow probes function well in many environments, their structural requirements prevent their use in certain applications. The most limiting structural requirement was that the sensor elements had to intrude into the flow area to provide a good heat transfer relationship with the fluid flowing through the conduit. Locating the sensors in the flow area subjected the sensors to damage from vibration produced by the flowing fluid. The intrusive sensor elements were also coated with particles from the fluid being measured which prevented the device from meeting "clean in place" standards for the food processing industry. Also, it was difficult to accurately measure the heater input power and this inaccuracy was reflected in the mass flow values obtained.

It is possible to simply remove the two sensors from the flow area and place them instead within the conduit wall or adjacent to the conduit. However, this arrangement raises other problems. First, with the sensor elements in contact with the conduit, heat from the heated sensor would be conducted to the upstream sensor and mask the true temperature reading. Also, sensors positioned outside the flow area could provide only boundary layer measurements which would cause the device to have an unfavorable time response as compared to the intrusive thermal flow probes.

SUMMARY OF THE INVENTION

It is a general object of the invention to overcome the above-described problems and others associated with thermal flow devices or probes and thermal flow measuring methods.

This broad object is accomplished by placing a heater element, a heated or base temperature sensor, and an input temperature sensor outside of the flow area of a sensor conduit and adding a third compensating temperature sensor also outside of the conduit flow area. The compensating temperature sensor is positioned between the other two sensors and enables the apparatus to prevent heat conducted along the conduit from interfering with the mass flow measurement. With the temperature readings from the three sensors, a parameter proportional to the coefficient of convective heat transfer to the fluid is determined in terms of the temperature readings alone, independent of any element of heat conducted through the conduit from the heater element. This normalized temperature parameter and a temperature value produced with the input temperature sensor are then used in a mathematical relationship to determine mass flow rate through the conduit.

In addition to the three temperature sensor elements and heater, the apparatus of the invention includes processing means for determining both the normalized temperature parameter and the mass flow rate. Since resistive temperature devices are preferably used as sensor elements, the processor also serves to convert the resistance signals provided by the sensors to temperature values.

The mass flow rate relationship used by the processing means is preferably obtained through an initial in situ calibration procedure. In the calibration procedure, mass flow rate through the conduit is varied at a constant input temperature to create a plot of mass flow rate versus the normalized temperature parameter. Several of such mass flow rate versus normalized temperature parameter curves are used at different input temperatures to express the mass flow rate in terms of a polynomial having certain constant terms and input temperature and the normalized temperature parameter as variables. The mass flow rate equation takes the same polynomial form for each installation and the constants are entered into the processing means after in situ calibration for each installation.

The method for measuring the mass flow of fluid through a conduit pursuant to the invention includes first applying heat to the conduit at a heater location along the length of the conduit. The method then includes determining the temperature of the conduit at a first location, a second location, and an intermediate location along the conduit. The first location is generally adjacent to the heater location while the second location is spaced from the first location in a direction opposite to the direction in which fluid is flowing through the conduit. The intermediate location is between the first and second locations.

Once the three temperatures are determined, the method continues with the step of using the temperature values to produce the normalized temperature parameter. The mass flow rate of fluid flowing through the conduit is then determined using the preferably empirically determined relationship for mass flow in terms of the input temperature and the normalized temperature parameter, and constants determined in the in situ calibration procedure.

The apparatus and method according to the invention provides several advantages over prior thermal mass flow measuring devices. First, the compensating sensor allows the conductive heat transfer coefficient to be decoupled from the convective heat transfer coefficient measurement. Therefore, the masking effect of heat conducted through the conduit to the sensor elements is eliminated. Also, since the sensors are non-intrusive, the apparatus meets the "clean in place" standards of the food industry and reduces the potential for damage to sensors arising from contact with the fluid being measured. Another important advantage of the present apparatus and method is that the mass flow determination is independent of the heat input by the heating means. This is advantageous because heat input cannot be accurately measured. Yet another major advantage of the current apparatus and method for measuring mass flow rate through a conduit is that the constants developed for the empirically determined mass flow rate equation take into account fluid viscosity changes with temperature. These viscosity changes effect the convective heat transfer coefficient and therefore the mass flow rate measurement.

These and other objects, advantages, and features of the invention will be apparent from the following description of the preferred embodiments, considered along with the accompanying drawings.

DESCRIPTION OF THE PREFERRED EMBODIMENT

Figure 1:
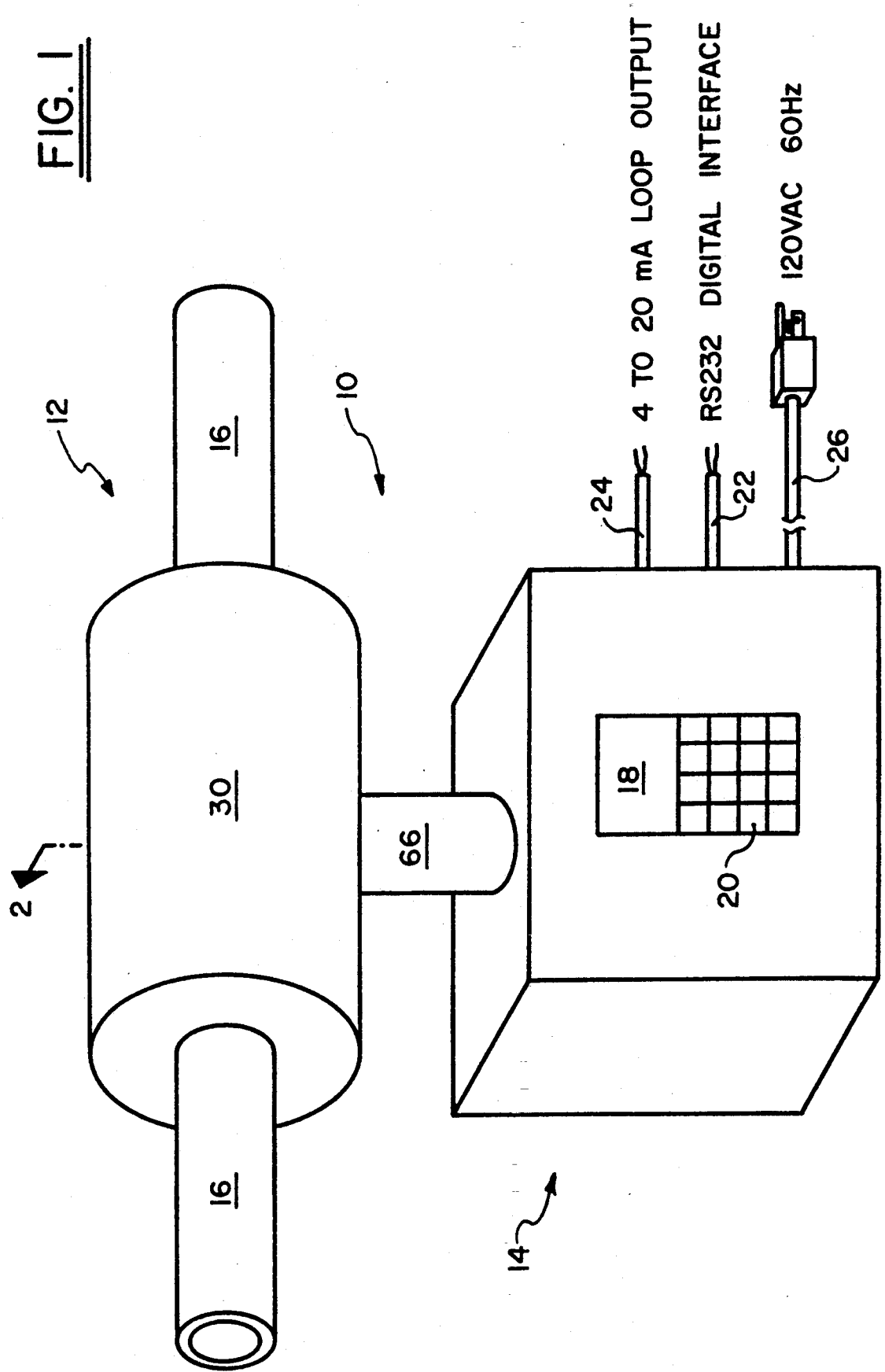
FIG. 1 is a schematic representation of a mass flow measuring apparatus embodying the principles of the invention.
Figure 2:
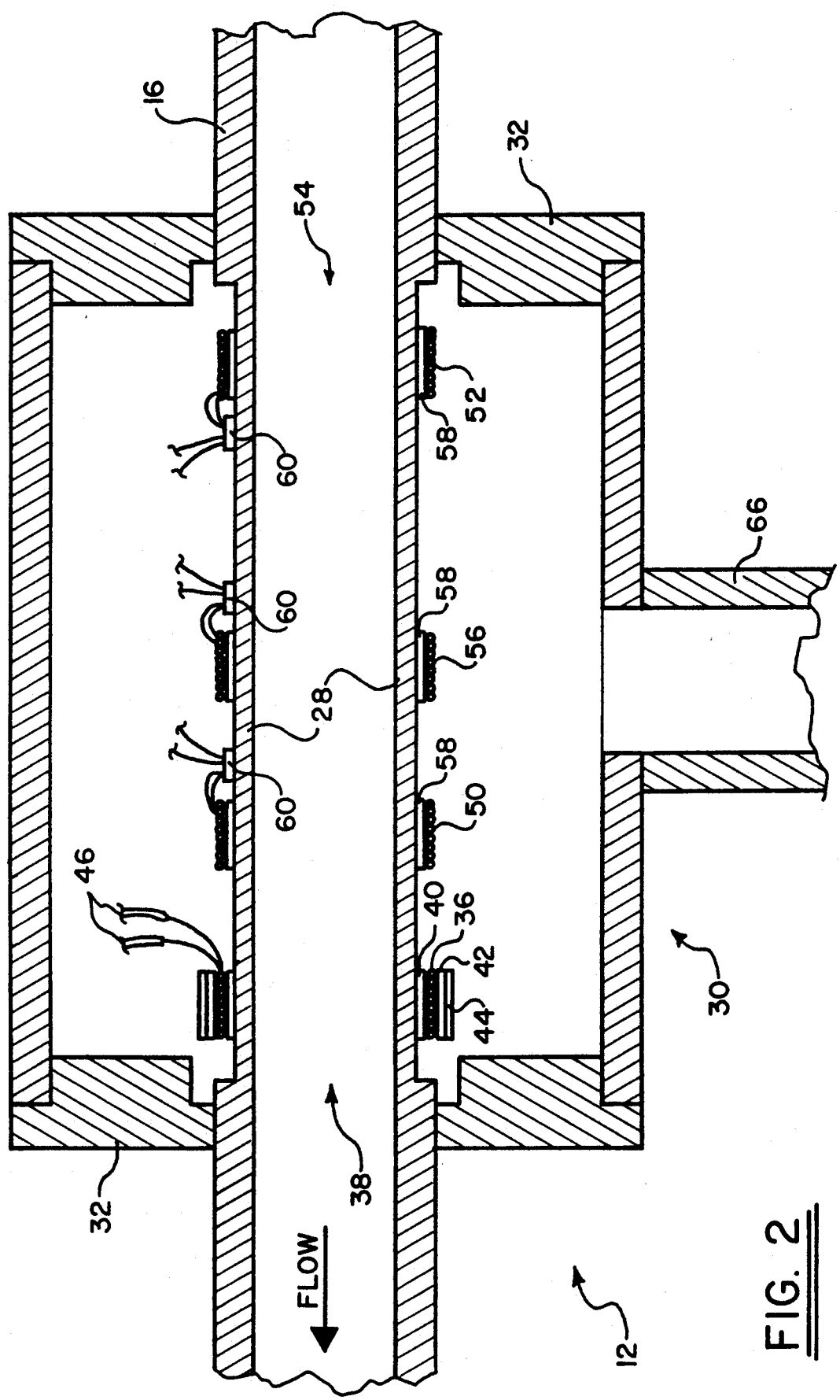
FIG. 2 is an enlarged, mostly schematic view in longitudinal section of the sensor unit shown in FIG. 1 with sensor and heater elements drawn to an exaggerated scale for purposes of illustration.
Figure 3:
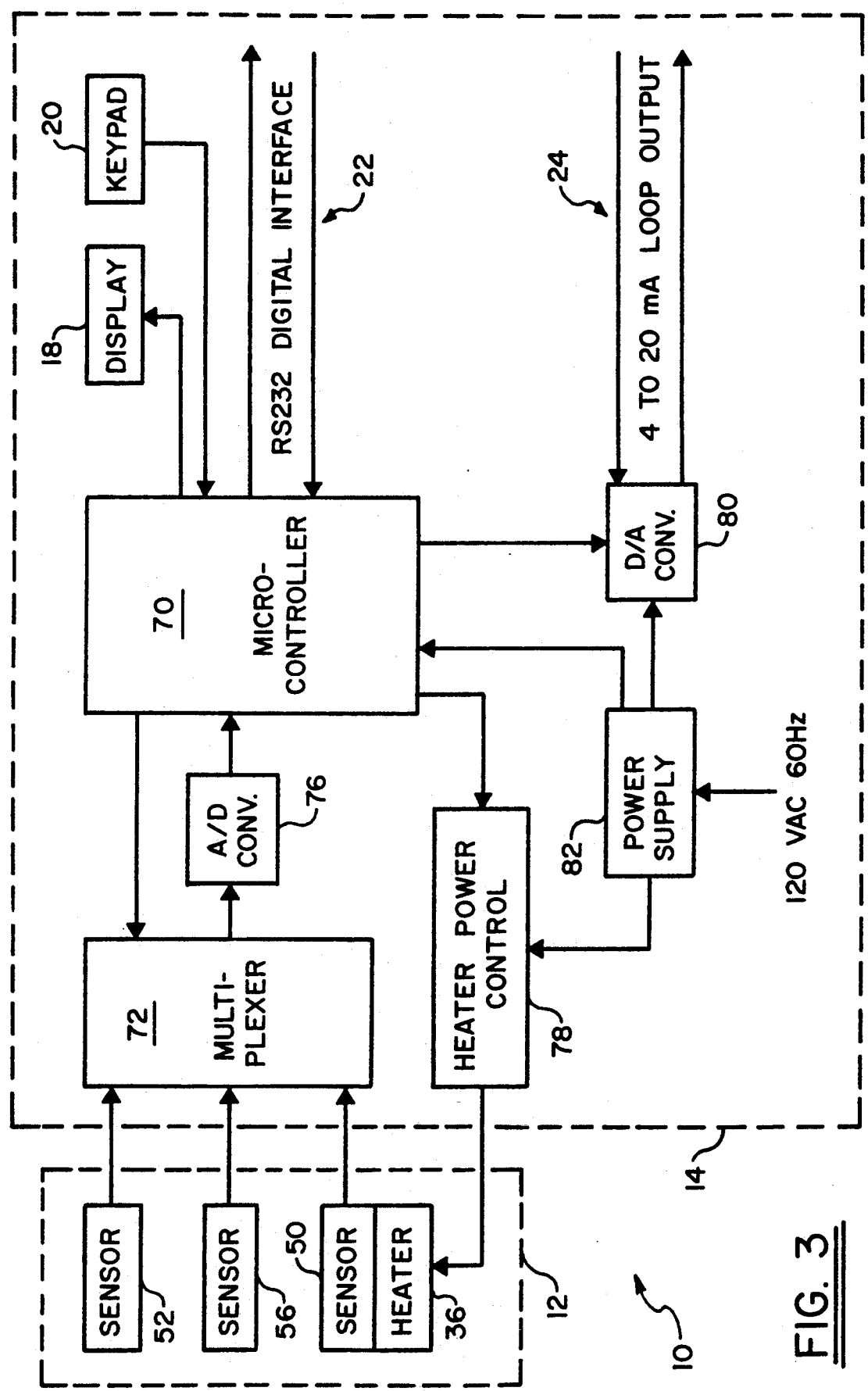
FIG. 3 is a block diagram illustrating the mass flow measuring apparatus embodying the principles of the invention.

FIGS. 1 through 3 illustrate by way of example the preferred form of mass flow measuring apparatus 10 embodying the principles of the invention. Referring to FIG. 1, the apparatus 10 includes a probe or a sensor unit 12 and a processor unit 14. The sensor unit 12 includes a conduit 16 adapted to receive the fluid whose mass flow rate is to be measured and operates to gather temperature-indicative data for the processor unit 14. The processor unit 14 may be positioned at a remote location from the sensor unit 12 and includes a digital display 18 and a keypad 20. The illustrated form of the invention also includes both digital and analog interfaces, 22 and 24, respectively, and a power connection 26 to the processor unit 14.

Referring particularly to FIG. 2, the sensor unit 12 includes the conduit 16 with a reduced thickness portion 28 covered by an outer tube 30. The outer tube 30 is sealingly connected to the sensor conduit 16 on both ends of the reduced thickness section 28 by end flanges 32, and serves to prevent a catastrophic failure of the device should the reduced thickness section rupture in operation. The reduced thickness section 28, although not necessary to the operation of the invention, is preferred for providing a better heat transfer relationship between the fluid in the conduit and the temperature sensors described below. Also, although not shown in the drawings, the conduit 16 preferably includes suitable connectors at each end for connecting the conduit for receiving the fluid to be measured. The fluid whose mass flow rate is to be measured may be a liquid, gas, or any other flowable material.

Referring still to FIG. 2, the preferred form of the sensor unit 12 includes a heater element 36 mounted on the reduced thickness section 28 of the sensor conduit 16 along with three separate temperature sensor elements. The heater element 36 preferably comprises an electrical resistive wire helically wound on the exterior surface of the sensor conduit 16 at a heater location which is preferably near an outlet end 38 of the reduced thickness section 28. The wire which forms the electrical resistive heater element 36 may be any suitable material and is insulated from the sensor conduit material preferably with a suitable fiberglass tape 40. Another layer of fiberglass tape 42 may be used to hold the heater element 36 in place and provide good heat conduction contact with the conduit 16. Also, a layer of reflective aluminum tape 44 may be positioned over the helically wound heater element 36 and fiberglass tape 42 to provide a radiant barrier. Both ends of the heater element wire 36 are terminated to a suitable gauge copper lead wire 46 preferably with a nickel brazing material.

The sensor unit 12 also includes a base sensor element 50 positioned along the length of the sensor conduit at a first location as close as possible to the heater location. An input sensor element 52 is positioned at a second longitudinal location along the sensor conduit 16 spaced from the first location toward an input end 54 of the reduced thickness section 28. That is, the second location, the position of the input sensor element 52, is spaced from the first location and base sensor element 50 in the direction opposite the direction of fluid flow through the conduit 16. Finally, a compensating sensor element 56 is positioned at an intermediate location along the sensor conduit reduced thickness section 28 between the first and second locations.

Each sensor element preferably comprises a length of platinum or other suitable wire helically wound on the exterior surface of the sensor conduit 16 in the reduced thickness section 28. The sensor element wire is electrically insulated from the sensor conduit 16 with a thin dielectric tape 58 positioned around the conduit before winding the wire thereon. The wire itself is also coated with a thin dielectric coating (not shown) to provide electrical insulation between adjacent coils of the element. Although other arrangements may be used according to the invention, the sensor element wire is preferably anchored to the conduit 16 with a ceramic adhesive (not shown). Both ends of each sensor wire are connected to a suitable gauge lead wire through a beryllium copper terminal 60 which is itself attached to the sensor conduit preferably with a high temperature epoxy (not shown).

Lead wires to the heater element 36 and each of the temperature sensor elements 50, 52, and 56 are themselves preferably anchored to the conduit with a suitable anchoring tape (not shown). All of the lead wires exit the outer tube 30 through a short wire or lead fitting 66. The end of the lead fitting 66 opposite the end connected to the outer tube 30 is preferably adapted to connect to a suitable wire conduit leading to the processor unit 14 as shown in FIG. 1.

The preferred longitudinal spacing between the three temperature sensors 50, 52, and 56 is a function of the ratio of the coefficient of conductive heat transfer of the conduit to the coefficient of convective heat transfer from the conduit to the fluid. Where $d_{12}$ designates the longitudinal distance between the base sensor 50 and the compensating sensor 56 and $d_{23}$ designates the distance between sensor 56 and the input sensor 52, the preferred sensor spacing may be determined by the following equations:

$$d_{12} = X/(Re^{0.8} - X/d_{23}), \text{ and}$$

$$X = \frac{K_{cd} D \, l}{L \, C^1}$$

$$C^1 = \text{const. } K_f(Pr^{0.3})$$

where

Re = Reynold's Number of the fluid flowing through the conduit
$K_{cd}$ = Thermal conductivity of conduit material.
D = diameter of conduit
l = conduit wall thickness
L = a distance proportional to the sensor width
$K_f$ = thermal conductivity of the fluid
Pr = Prandtl Number Referring to FIG. 3, the processor unit 14 includes a microcontroller or processor 70 for performing the data signal processing functions employed in the method of the invention. Controller 70 preferably comprises a general purpose microprocessor and suitable memory devices. The controller 70 receives signals from the sensor elements 50, 52, and 56 through a multiplexer 72. The multiplexed individual sensor signals are converted from an analog resistance signal to a digital signal acceptable to the controller 70 by an analog to digital converter 76.

The controller 70 also controls the input power to the heating element 36 through a heater power control circuit 78. As discussed below, one significant advantage of the apparatus and method of the invention is that the heater input power value is not used in producing the mass flow measurement. The independence of mass flow from the heater input power is significant because heater input power cannot be accurately determined in practice.

Both the digital RS232 interface 22 and the analog interface 24 are preferably provided to the controller 70. Interface to the controller 70 allows the apparatus 10 to be connected to a control system or other device (not shown) that controls the process or apparatus in which the mass flow measurement is required. The interfaces may also be used in providing other functions such as recording, for example. The analog interface 24 through a digital to analog converter 80 is preferably provided because many industrial process control systems currently in use employ a 4 to 20 milliamp analog control or monitor loop.

Power for the various elements of the processor unit 14 is provided by a separate power supply circuit 82. The power supply circuit 82 controls and converts input power, usually 120 volt AC, to DC power suitable for operating the controller 70, heater power control 78, and other processor unit elements.

According to the method of the invention and the operation of the apparatus 10 described above, the sensor conduit 16 is connected to receive the subject fluid at its input end 54. With the subject fluid flowing through the sensor conduit 16 in the direction from the input end 54 to output end 38, the method includes supplying heat to the conduit at the heater location, in the illustrated case with the heater element 36. The method also includes determining the temperature of the conduit at the first location, the intermediate location, and the second location. In the illustrated form of the invention the temperature determining step is performed by the resistance temperature devices 50, 52, and 56 and the controller 70 serving as temperature signal processing means. The temperature indicative resistance signals provided by the temperature sensor elements 50, 52, and 56, are converted to temperature values by the controller 70 through any suitable method.

The method of the invention also includes determining the value of a normalized temperature parameter from the three temperatures provided by the base, compensating, and input temperature sensors 50, 56, and 52, respectively and controller 70. The normalized temperature parameter is proportional to the coefficient of convective heat transfer between the fluid and conduit 16 and is provided by the following expression:

$$P = [(T_1 - T_3)/(T_2 - T_3)](T_2/T_1) - 1$$

where:
$T_1$ = Temperature value produced from the base sensor element signal;
$T_2$ = Temperature value produced from the compensating sensor element signal; and
$T_3$ = Temperature value produced from the input sensor element signal.
P = Normalized Temperature Parameter.

This calculation is performed by the controller 70 in the illustrated form of the invention.

With the normalized temperature parameter calculated, the controller 70 then operates to determine the mass flow rate from the following empirically determined relationship relating mass flow rate to the input temperature provided from the input sensor 52, and the normalized temperature parameter.

$$MF = (g_{00} + g_{01}T_3) = (g_{10} + g_{11}T_3)(P) = (g_{20} + g_{21}t_3)(P^2)$$

where:
MF = Mass Flow Rate
$T_3$ = Temperature value produced from the input sensor element.
P = Normalized Temperature Parameter.
$g_{00}$ to $g_{32}$ = empirically determined constants obtained from in situ calibration plots. Constants $g_{00}$ to $g_{21}$ are determined through in situ calibration described below. The mass flow rate can then be read to the display 18 or sent to other control systems through either the digital or analog interface, 22 or 24, respectively.

The in situ calibration procedure consists of first varying the mass flow rate through the sensor conduit 16 at a constant input temperature and producing a plot of mass flow rate versus the normalized temperature parameter at the constant input temperature. Several such plots are produced, each at a different input temperature, and from these plots the constants may be determined for the above-described mass flow equation.

Those skilled in the art will appreciate that the relationship for mass flow rate may be derived theoretically for certain fluids. Determining the mass flow relationship empirically avoids the complexity involved in a theoretical determination for most fluids. Also, a normalized temperature parameter proportional to the coefficient of convective heat transfer between the fluid and the conduit may be expressed in several different forms using only the temperature readings.

The above described preferred embodiments are intended to illustrate the principles of the invention, but not to limit the scope of the invention. Various other embodiments and modifications to these preferred embodiments may be made by those skilled in the art without departing from the scope of the following claims. For example, heating and temperature sensor elements other than electrical resistive elements may be employed. Also many types of conduit configurations may be used alternatively to the illustrated conduit.

We claim:

1. A mass flow measuring apparatus comprising:

(a) an elongated conduit with an internal cross-sectional area defining a flow area, the conduit having an input end and an output end and being capable of receiving at the input end a material whose mass flow rate is to be measured and carrying the material to the output end;

(b) base sensor means positioned outside of the flow area in heat conductive contact with the conduit at a first location along the conduit for providing a base signal indicative of the temperature of the base sensor means;

(c) heating means in heat conductive contact with the conduit at a heater location along the conduit generally adjacent to the first location, the heating means for supplying heat to the conduit;

(d) input sensor means positioned in heat conductive contact with the conduit outside of the flow area at a second location along the conduit spaced from the first location in the direction toward the input end of the conduit, the input sensor means for providing an input signal indicative of the temperature of the input sensor means;

(e) compensator sensor means positioned in heat conductive contact with the conduit outside of the flow area at an intermediate location along the conduit between the first and second locations, the compensator sensor means for providing a compensating signal indicative of the temperature of the compensator sensor means;

(f) temperature signal processing means for producing a base temperature value from the base signal, a compensating temperature value from the compensating signal, and an input temperature value from the input signal, the base, compensating, and input temperature values representing the temperature of the base sensor means, the compensator sensor means, and input sensor means, respectively; and (g) mass flow processing means for calculating from the base, compensating, and input temperature values a normalized temperature parameter proportional to the coefficient of convective heat transfer from the conduit to the fluid flowing therethrough, and for calculating the mass flow of fluid through the conduit from a relationship for the mass flow through the conduit in terms of the normalized temperature parameter and the input temperature value.

2. The apparatus of claim 1 wherein the base sensor means, the compensator sensor means, and the input sensor means each include:

(a) an electrical resistive temperature sensing element helically wound on the exterior surface of the conduit.

3. The apparatus of claim 2 wherein the heating means includes:

(a) an electrical resistive heating element helically wound on the exterior surface of the conduit.

4. The apparatus of claim 3 further comprising:

(a) an elongated outer tube sealingly connected at both ends to the conduit so as to enclose the heating element, and the sensing elements of the base sensor means, the compensating sensor means, and the input sensor means.

5. The apparatus of claim 4 wherein:

(a) the conduit includes a reduced wall thickness section in an area enclosed by the outer tube.

6. The apparatus of claim 1 wherein the mass flow processing means and the temperature signal processing means comprise:

(a) a digital processor capable of receiving the base signal, compensating signal, and input signal, and producing temperature values and the normalized temperature parameter therefrom and then determining the mass flow rate through the conduit from the empirically determined relationship between the mass flow rate and the normalized temperature parameter and input temperature value.

7. A mass flow measuring apparatus comprising:

(a) an elongated conduit having an input end and an output end and being capable of receiving at the input end a material whose mass flow rate is to be measured and carrying the material to the output end;

(b) temperature determining means for determining the temperature of the conduit at a first location along the length of the conduit, a second location along the length of the conduit spaced from the first location in the direction toward the input end, and an intermediate location between the first and second locations;

(c) heating means positioned in heat conductive contact with the conduit at a heater location generally adjacent to the first location for heating the conduit;

(d) mass flow processing means for calculating from the temperatures determined simultaneously at the first location, the intermediate location, and the second location a normalized temperature parameter related to the convective heat transfer coefficient of the conduit, and for calculating the mass flow rate of fluid through the conduit from a relationship relating the mass flow through the conduit to the normalized temperature parameter and temperature at the second location.

8. The mass flow measuring apparatus of claim 7 wherein the temperature determining means includes:

(a) a base temperature sensor element positioned at the first location;

(b) an compensating temperature sensor element positioned at the intermediate location;

(c) an input temperature sensor element positioned at the second location; and (d) temperature signal processing means for converting signals received from the base, compensating, and input temperature sensor elements into temperature values.

9. The mass flow measuring apparatus of claim 8 wherein the mass flow processing means and temperature signal processing means comprise:

(a) a digital processor.

10. A method of measuring the mass flow of a fluid flowing in one direction through an elongated conduit, the method comprising the steps of:

(a) applying heat to the conduit at a heater location along the length of the conduit;

(b) determining the temperature of the conduit at a first location along the conduit adjacent to the heater location;

(c) determining the temperature of the conduit at a second location along the conduit, the second location being spaced from the first location in a direction opposite to the direction in which fluid is flowing through the conduit;

(d) determining the temperature of the conduit at an intermediate location along the conduit, the intermediate location being between the first and second locations;

(e) producing a normalized temperature parameter from the temperatures obtained substantially simultaneously at the first, intermediate, and second locations, the normalized temperature parameter being proportional to the coefficient of convective heat transfer between the conduit and the fluid flowing therethrough; and (f) determining the mass flow of the fluid flowing through the conduit from a relationship defining the mass flow of the fluid through the conduit in terms of the normalized temperature parameter and the temperature of the conduit at the second location.

11. The method of claim 10 wherein the step of applying heat to a conduit includes:

(a) directing an electrical current through an electrical resistive element helically wound on the exterior surface of the conduit.

12. The method of claim 10 wherein the steps of determining the temperature of the conduit at the first, second, and intermediate locations each include:

(a) producing a signal indicative of the temperature of the conduit at the respective location; and (b) calculating a temperature value from the temperature indicative signal.

13. The method of claim 10 wherein the steps of determining the temperature at the first, second, and intermediate locations each include:

(a) measuring the resistance of an electrical resistive element helically wound on the conduit at the respective longitudinal location.

14. The method of claim 10 wherein the step of generating the normalized temperature parameter comprises:

(a) determining the numerical value of the expression $P = [(T_1 - T_3)/(T_2 - T_3)](T_2/T_1) - 1$.

15. The method of claim 10 wherein the relationship between the mass flow of the fluid through the conduit and the normalized temperature parameter is determined by the steps of:

(a) during a set up period varying the mass flow rate at a plurality of constant fluid input temperatures;

(b) determining the normalized temperature parameter at each flow rate; and (c) plotting the normalized temperature parameter as a function of mass flow rate for each constant fluid input temperature to produce a series of curves from which said relationship may be derived.

* * * * *